Sept. 17, 1940.  T. EHRLER ET AL  2,215,148
ELECTRICAL GAUGE FOR MEASURING LENGTHS
Filed May 27, 1938
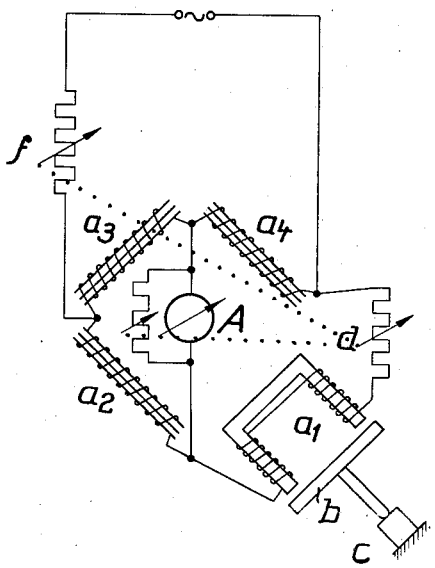
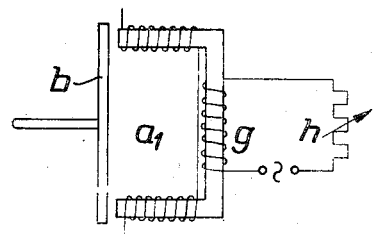
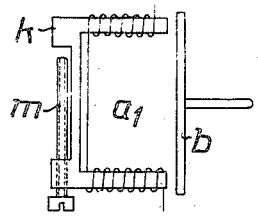

Patented Sept. 17, 1940

2,215,148

UNITED STATES PATENT OFFICE 2,215,148

ELECTRICAL GAUGE FOR MEASURING LENGTHS

Theobald Ehrler and Karl Max Harder, Hamburg, Germany, assignors to Bauer & Schaurte, Neuss-on-the-Rhine, Germany, a corporation of Germany Application May 27, 1938, Serial No. 210,538
In Germany May 7, 1937

1 Claim. (Cl. 177—351)

This invention relates to an electrical gauge for measuring lengths, and particularly to such a gauge utilizing variations of the air-gap of an iron-closed alternating current coil, effected by a movable iron anchor mechanically connected to a touching pin.

The measuring coil of such a gauge commonly is arranged in an alternating current bridge, which includes in a diagonal branch an indicating instrument. For measurement of objects having different lengths the zero-point of the indicating instrument must be adjusted in each case. On the other hand, the sensitiveness of said measuring device varies with variations in the distance between the movable anchor and the iron core of the induction coil, effected by the various lengths to be measured. Therefore means are provided to compensate for these variations of sensitiveness.

A feature of this invention is an arrangement, in which the means for adjusting the zero-point of the indicating instrument connected in a diagonal branch of an alternating current Wheatstone-bridge have been coupled with the means for compensating the variations in sensitiveness of the measuring device. Using such a combination objects having different lengths can be measured with a practically constant sensitiveness of the device.

The means for adjusting the zero-point of the indicating instrument may consist, for instance, of an ohmic resistance, inserted into a branch of the Wheatstone-bridge in series or in parallel with the measuring coil. Said resistance also may be connected as a potentiometer to the indicating instrument. An adjustment of the zero-point further may be obtained by varying the resistance of a separate winding provided at the yoke of the measuring coil and combined with an adjustable ohmic resistance. Finally, the yoke of the said measuring coil may be provided with a separate air-gap, the width of which can be varied in a suitable manner, for instance, by means of a fine threaded screw consisting of a ferromagnetic material. By varying the inductive resistance of the measuring coil in such a manner, the zero-point of the instrument also can be adjusted. By using one of the means mentioned above it is rendered possible to adjust the indicating instrument in any desired degree.

The means for adjusting the sensitiveness of the device or compensating variations of the same may consist of an ohmic resistance connected to the indicating instrument as a shunt, or connected in series with the source of current, attached to the bridge.

The invention is illustrated diagrammatically and by way of example on the accompanying drawing in which:

Fig. 1 is a representation of a device designed according to this invention and included in a bridge connection; and Figures 2 and 3 show two further modifications, fully described hereinafter.

In Fig. 1, $a_1$, $a_2$, $a_3$, $a_4$ are choking coils combined with one another in such a manner as to constitute a measuring bridge, and A is an indication instrument arranged in one of the diagonals of said bridge, whereas the other diagonal is connected with the supply wires of an alternating current source. The measuring choking coil $a_1$ is provided with a movable armature $b$, the touching pin of which contacts with the object $c$ to be examined. Owing to the variation of the air-gap between the armature $b$ and the coil $a_1$ which occurs when the touching pin contacts with the object $c$ the magnetic resistance of the path of the lines of force and, therefore, also the field strength and the apparent resistance of the choking coil are varied, so that the indication instrument is deflected thus providing a measurement of the length of the object.

For adjusting the zero-point of the instrument A a variable ohmic resistance $d$ is connected into a branch of the bridge $a_1$, $a_2$, $a_3$, $a_4$, especially in series or in parallel with the measuring induction coil $a_1$. The ohmic resistance also may be connected as a potentiometer between the two branches $a_3$ and $a_4$ of the bridge and attached to the indicating instrument A. An adjustable ohmic resistance $e$ or $f$ may be connected as a shunt to the instrument A or between the alternating current source and the bridge for compensating the variations of sensitiveness of the device effected by various distances between the measuring coil $a_1$ and the armature $b$, which is coupled with the touching pin. The adjusting means of the resistance $d$ and the resistance $e$ or $f$ are coupled with one another.

Fig. 2 shows other means for adjusting the zero-point of the instrument. The iron-closed measuring coil $a_1$, the inductive resistance of which is varied by movement of the displaceable armature $b$, is provided with a separate winding $g$, through which flows an alternating current, the phase and the frequency of which is the same as the current flowing through the measuring coil. An adjustable ohmic resistance $h$ connected to this winding and the alternating current source is adapted to vary the current intensity in said separate winding and therewith the magnetic flux in the iron core of the measuring coil.

Other means for adjusting the zero-point of the indicating instrument are illustrated in Fig. 3. A separate adjustable air gap of the iron core associated with the measuring coil $a_1$ is provided in parallel with the air gap between said core and the movable anchor $b$. The transverse section of the iron core $k$ of the choking coil is reduced by means of a recess provided at a suitable place. The length of the path of reduced transverse section can be varied by means of a fine threaded screw $m$ of a ferromagnetic material, the transverse section of said screw coacting correspondingly on a longer or shorter portion of the path of the lines of force. The accuracy of the adjustment is determined by the ratio between the reduced transverse section of the iron circuit on the one hand to the transverse section and the pitch of screw $m$ on the other hand.

What we claim as new and desire to secure by Letters Patent of the United States is:

In an electrical gauge comprising an iron-closed alternating current choking coil having an air gap, a movable iron anchor and a touching pin connected to said anchor, said choking coil being included in an alternating current bridge which includes in a diagonal branch an indicating instrument and means for adjusting the zero-point of said instrument whereby the sensitivity of the instrument is normally altered, the improvement comprising means for varying the sensitivity jointly operable with said zero-point adjustment whereby the variation in sensitivity effected by said sensitivity-varying means is inversely proportional to the variation in sensitivity normally produced by said zero-point adjustment.

THEOBALD EHRLER.
KARL MAX HARDER.